United States Patent [19]

Muramatsu

[11] Patent Number: 5,211,256
[45] Date of Patent: May 18, 1993

[54] PEDAL STRUCTURE FOR MOTORCYCLE

[75] Inventor: Takayoshi Muramatsu, Iwata, Japan

[73] Assignee: Yamaha Hatsudoki Kabushiki Kaisha, Iwata, Japan

[21] Appl. No.: 723,854

[22] Filed: Jul. 1, 1991

[30] Foreign Application Priority Data

Jul. 13, 1990 [JP] Japan ................................ 2-186105
Jul. 13, 1990 [JP] Japan ................................ 2-186106

[51] Int. Cl.⁵ .............................................. B60K 23/00
[52] U.S. Cl. ................................... 180/219; 180/293; 74/474; 74/512; 74/562.5
[58] Field of Search ............... 180/219, 230, 274, 293; 188/181 A; 74/560, 562.5, 512, 474

[56] References Cited

U.S. PATENT DOCUMENTS

| | | | |
|---|---|---|---|
| 3,542,146 | 11/1970 | Hooper | 180/230 X |
| 4,181,190 | 1/1980 | Yang | 180/219 |
| 4,492,284 | 1/1985 | Hayashi | 180/219 |
| 4,633,727 | 1/1987 | Pike | 180/293 X |

*Primary Examiner*—Margaret A. Focarino
*Assistant Examiner*—Carla Mattix
*Attorney, Agent, or Firm*—Ernest A. Beutler

[57] ABSTRACT

A motorcycle construction having a seat and a pair of foot pegs to accommodate the feet of the rider seated on the seat. A brake system for the motorcycle includes a master cylinder that is operated by a pedal at one side of the motorcycle through a force applying linkage system. The power unit of the motorcycle includes a change speed transmission which is operated by a pedal positioned at the other side of the motorcycle through a force applying linkage system. Both the brake and transmission control pedals are spaced inwardly of the foot pegs and forwardly thereof so as to afford a narrow construction.

18 Claims, 4 Drawing Sheets

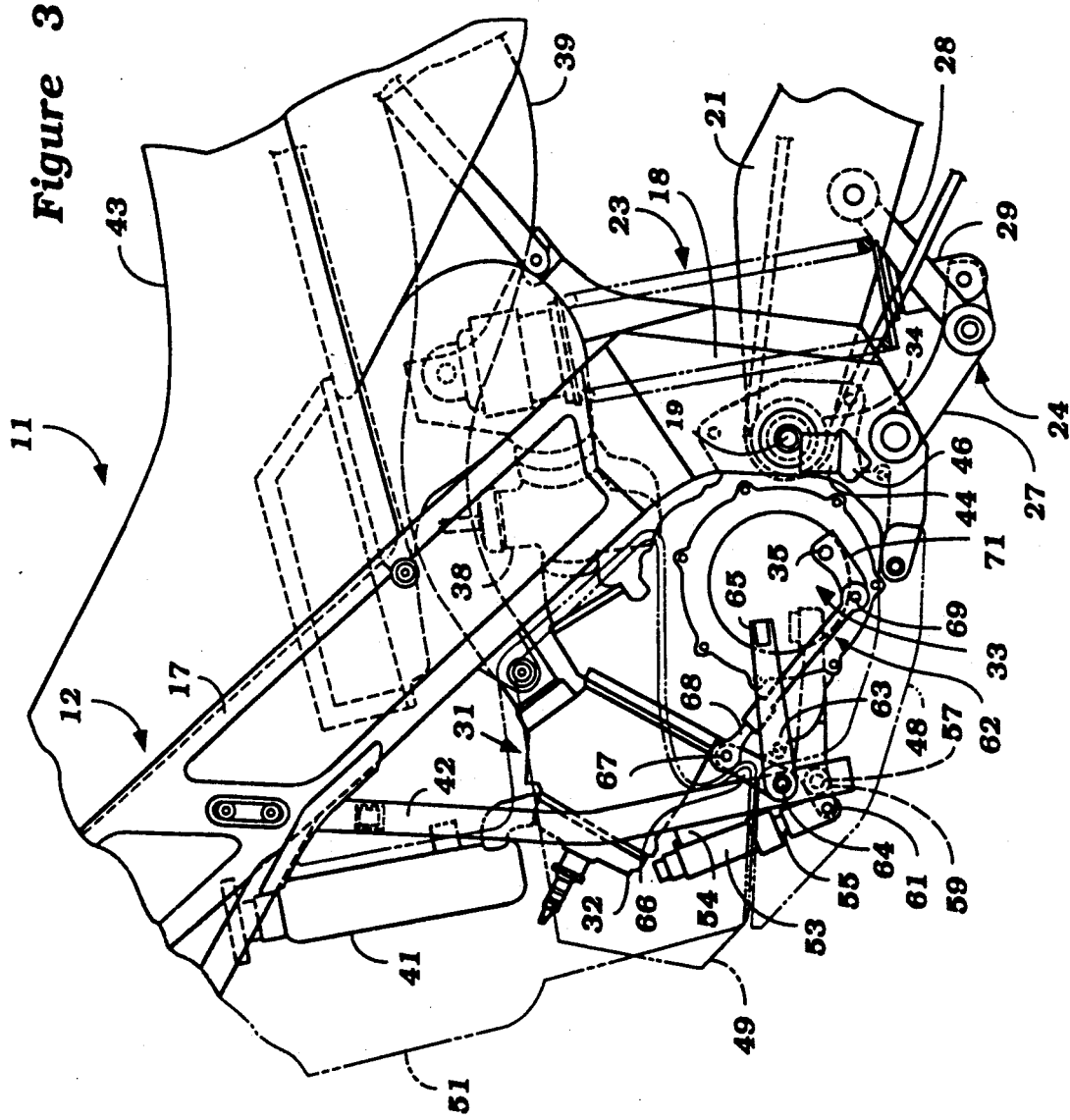

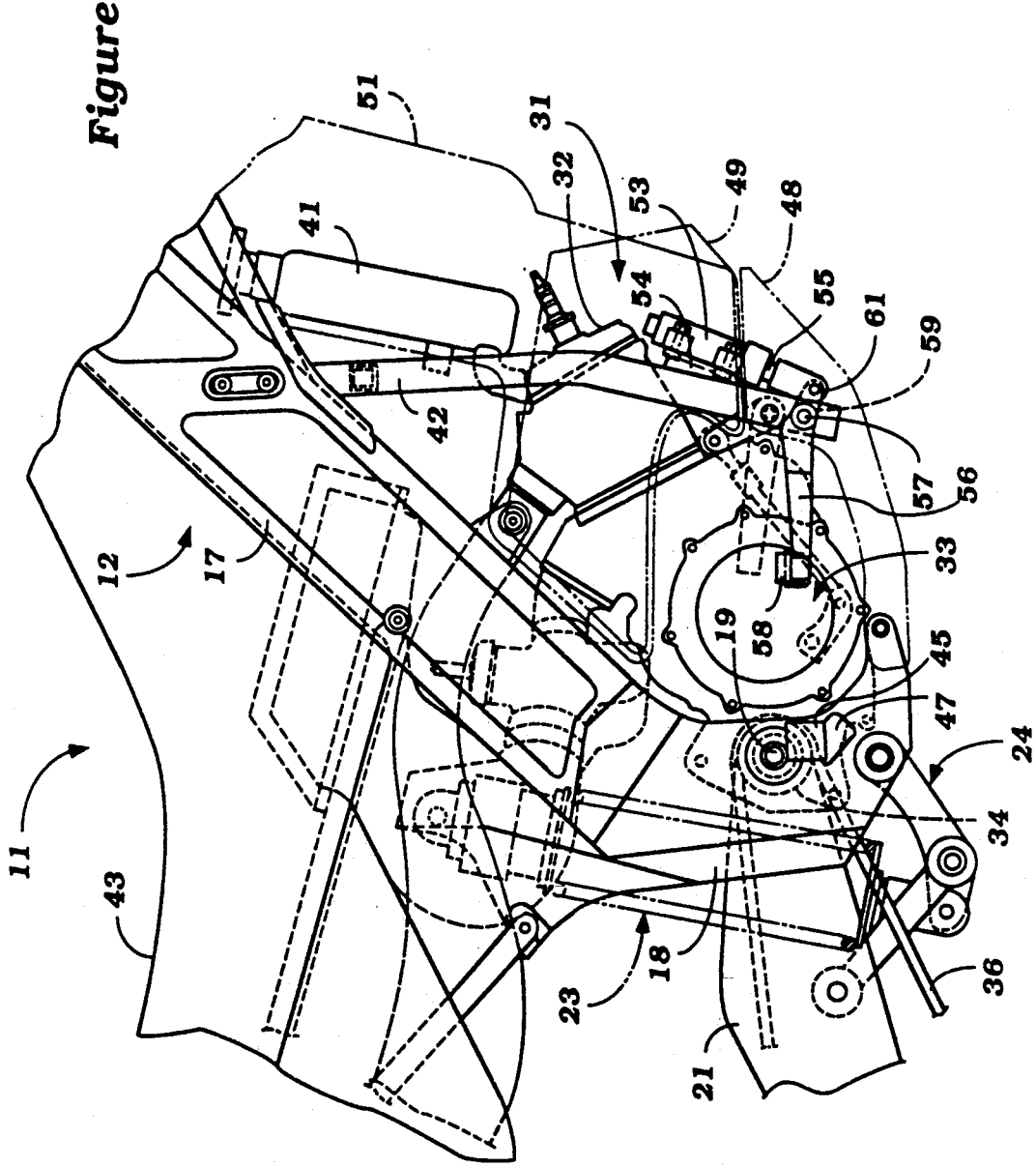

PEDAL STRUCTURE FOR MOTORCYCLE

BACKGROUND OF THE INVENTION

This invention relates to a motorcycle and more particularly to an improved pedal arrangement for a motorcycle.

As is well known, most motorcycle assemblies include a frame having a seat on which a rider seats in straddle fashion. A pair of foot pegs are carried at the lower end of the frame at opposite sides thereof for the rider to rest his feet when riding. Frequently, there are also provided foot controls for operating certain components of the motorcycle. For example, it is common to have a change speed transmission on the motorcycle that is operated by a rotatably supported lever which rotates a cam drum to shift the shift forks and engage the selected gears of the transmission. In addition, there may be provided a foot operated brake that is operated by a pedal which actuates either a master cylinder or a cable system for applying one or both of the wheel brakes of the motorcycle. Conventionally, these brake and/or transmission operating pedals are positioned adjacent the foot pegs so the operator can operate them when his feet are still on the foot pegs. Although this arrangement has an apparent advantage, it also has some disadvantages.

One reason the pedals for actuating the brake and transmission are positioned in proximity to the foot pegs is that it is desirable to maintain a lever ratio between the pedal and the device actuated thereby that provides a mechanical advantage. Normally this has been done by positioning the pedals either adjacent or rearwardly of the foot pegs. When this position is chosen, then the pedals must be positioned outboard of the foot pegs to assure ease of operation and this substantially increases the width of the motorcycle. Because the width of the motorcycle is increased at a low point, this minimizes the amount the rider may lean the motorcycle when cornering and thus can adversely affect the handling of the motorcycle.

It is, therefore, a principal object to this invention to provide an improved pedal structure for a motorcycle.

It is also a further object to this invention to provide a pedal structure for a motorcycle wherein the pedals are located in such a way that the motorcycle maintains a narrow width.

It is a further object to this invention to provide an improved pedal structure for operating a device such as a brake or transmission of a motorcycle that permits the incorporation of a linkage system that amplifies the force exerted by the operator on the control device.

SUMMARY OF THE INVENTION

This invention is adapted to be embodied in a motorcycle construction that is comprised of a frame assembly supporting front and rear wheel and carrying a seat for accommodating a rider, an engine and change speed transmission is carried by the frame assembly for driving the rear wheel. A pair of foot pegs are carried at the lower portion of the frame on opposite sides thereof for accommodating the feet of a rider seated upon the seat. A brake is incorporated for braking at least one of the wheels and is operated by a master cylinder carried by the frame assembly. An operating pedal is supported for movement by the frame assembly forwardly of and spaced from the foot pegs and means connect the pedal to one of the transmission and master cylinder for operation thereof by a rider seated on the seat.

BRIEF DESCRIPTION OF THE DRAWINGS

FIG. 3 is an enlarged side elevational view of the motorcycle looking from the side depicted in FIG. 1.

FIG. 4 is an enlarged side elevational view looking in the opposite direction.

DETAILED DESCRIPTION OF THE PREFERRED EMBODIMENT OF THE INVENTION

Figure 1:
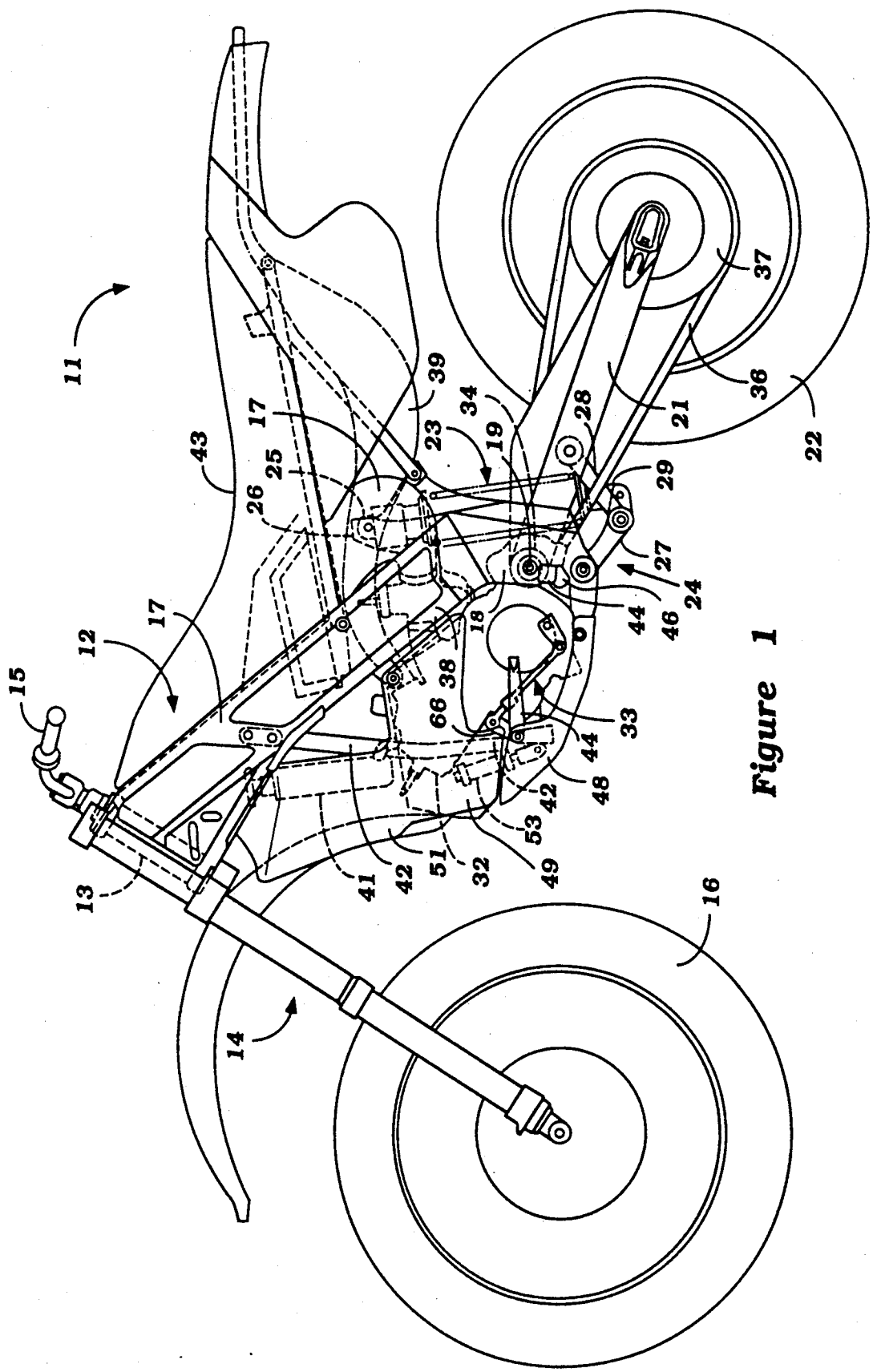
FIG. 1 is a side elevation view of a motorcycle having a pedal arrangement constructed in accordance with an embodiment of the invention.

Referring in detail to the drawings, a motorcycle constructed in accordance with an embodiment of the invention is identified generally by the reference numeral 11. The invention is described in conjunction with a motorcycle because it has particular utility with this type of vehicle since this type of vehicle is normally operated by a rider seated on a seat in straddle fashion and operating certain components of the motorcycle with his feet. Of course, the invention can be practiced with other types of vehicles having such seating and control arrangements. The motorcycle 11 is comprised of a frame assembly, indicated generally by the reference numeral 12 and which is of a welded construction of the type known as a "Delta-Box" type. This type of frame assembly has a head pipe 13 that journals a front fork assembly 14 for steering movement about an upright and slightly rearwardly inclined steering axis by means of a handle bar assembly 15 in a known manner. A front wheel 16 is rotatably supported at the lower end of the front fork assembly 14. The front fork assembly 14 may include, if desired, a suspension system of any known type.

A pair of main frame members 17 which may be comprised of fabrications formed from a light alloy material are affixed at their forward ends to the head pipe 13 and extend rearwardly and downwardly therefrom to a rear suspension supporting fabrication 18. The fabrication 18 provides a pivotal support 19 for a trailing arm assembly 21. The trailing arm assembly 21 in turn rotatably journals a rear wheel 22 which is driven, in a manner to be described.

A suspension element, indicated generally by the reference numeral 23 is interposed between the frame assembly 12 and a linkage system, indicated generally by the reference numeral 24 which linkage system loads the suspension element 23 upon pivotal movement of the trailing arm 21. The suspension element 23 includes a hydraulic shock absorber that is surrounded by a coil compression spring. At its upper end, the suspension element 23 carries as trunion portion 25 that affords attachment to a frame member 26 which is suitably affixed to the rear ends of the main frame members 17.

The linkage assembly 24 includes a first link 27 that is pivotally mounted to the fabrication 18 and a second link 28 that is pivotally connected to the trailing arm 21 and to the first link 27. The suspension element 23 has a piston rod 29 that is pivotally connected to an extension of the link 27 so the suspension element 23 will be loaded on pivotal movement of the trailing arm 23.

A power plant, comprised of a combined internal combustion engine and change speed transmission assembly, indicated generally by the reference numeral 31, is suspended in the frame assembly 12 and drives the rear wheel 22. In the illustrated embodiment, the power plant 31 includes a single cylinder internal combustion engine of the water cooled type operating on a two stroke crankcase compression principle. This engine has a forwardly inclined cylinder assembly 32 defining a single cylinder bore that is inclined to the vertical in a forward direction and extends in a nearly horizontal plane. Although the invention is described in conjunction with such a single cylinder engine, it will be readily apparent to those skilled in the art that the invention can be employed with other types of units.

The crankcase of the engine is provided with a change speed transmission which is indicated generally by the reference numeral 33. This transmission may be of any known type and generally incorporates parallel primary and secondary shafts on which a plurality of intermeshing gear sets are provided. These gear sets are selectively engaged for driving relationship with their respective shafts to transmit power to an output sprocket 34 by means of a shifting mechanism including a shifting drum (not shown) that is journaled with a shaft 35 that is accessible through a side of the transmission 33 for shifting purposes. This shifting drum, as is well known in this art, has one or more grooves in which shift forks are slideably supported for operating dog clutches associated with the gears to accomplish their shifting.

The sprocket 34 has its axis of rotation coaxial with the pivot point 19 of the trailing arm 23 and drives a chain 36 which, in turn, drives a sprocket 37 that is affixed to the rear wheel 22 for driving the rear wheel in a known manner.

The power unit 31 and specifically the engine portion thereof has an induction system that is comprised of a carburetor 37 that is positioned rearwardly of the cylinder 32 and which draws air through an air inlet device (not shown) for delivery to the intake port of the engine in a known manner.

The charge which has been burnt in the engine is discharged through an exhaust system which includes an exhaust pipe and expansion chamber unit 38 that extends rearwardly and to one side of the motorcycle 11 for discharge of the silenced exhaust gases to the atmosphere in a well known manner.

The engine portion of the power unit 31 is also at least partially water cooled and for this purpose a cooling radiator 41 is supported by the frame assembly above the cylinder 32. The coolant is circulated through the radiator 41 from the cooling jacket of the engine in a known manner.

The radiator 41 is suspended from the main frame member 17 and a pair of down tubes 42 that are affixed to the main frame members 17 and which depend downwardly therefrom.

A seat 43 is carried at the upper portion of the frame assembly 12 and primarily by the main frame members 17. The seat 43, as is typical with motorcycle practice, is adapted to accommodate a rider seated thereon in straddle fashion with his legs depending on opposite sides of the frame assembly 12 adjacent the fabrication 18. Left and right foot pegs 44 and 45 are carried at the opposite sides of the frame assembly on the fabrication 18 by mounting brackets 46 and 47, respectively. The connection between the foot pegs 44 and 45 and the brackets 46 and 47 is a pivotal connection so that the operator may pivot the foot pegs 44 and 45 up out of their normal positions if desired. The figures all illustrate the foot pegs 44 and 45 in their normal outwardly extending positions.

The motorcycle 11 is provided with certain body components such as a skid plate 48 that extends beneath the lower portion of the motorcycle so as to protect the power unit 31 and certain other components, as should be readily apparent. In addition, a front plate 49 encircles the forward portion of the engine and protects it. A pair of side plates 51 extend along opposite sides of the motorcycle and admit air to the radiator 41 while providing side protection for the rider's legs.

One or both of the front and rear wheels 16 and 21 is provided with a hydraulically operated brake assembly, which may be of any known type, such as either a disk or drum type of brake. Either or both of these brake assemblies are energized by a master cylinder, indicated generally by the reference numeral 53 and which is mounted in a generally vertically extending position at the front of the frame assembly 12 by one of the down tubes 42.

In the illustrated embodiment, the brake assembly 53 is mounted by the right hand down tube 42 by means including a bracket 54 that is either welded or otherwise affixed to this down tube. The master cylinder 53 has a downwardly extending piston rod 55 that is actuated by means of a pedal operated linkage assembly that is positioned on the right hand side of the motorcycle 11 and which includes a brake pedal lever 56 that is pivotally supported on the downtube 42 that supports the master cylinder 53 by means of a pivot pin 57 which, it should be noted, is spaced a substantial distance forwardly of the right hand foot peg 45. The lever 56 is, in fact, a bell crank and has a long rearward portion that carries a pedal 58 that is positioned so that is may be operated by the right hand foot of the operator. However, the location is such that the operator should take his foot off of the foot peg 45 to press the pedal 58.

The brake pedal lever 56 has shorter lever arm portion 59 that extends forwardly of the pivot point 57 and which has a pivotal connection 61 to the piston rod 55 of the master cylinder 53 for actuating it. As a result of this arrangement it is possible to employ the mechanical advantage of the pedal lever 56 to amplify the force applied to the master cylinder 53. As a result, substantially greater braking forces may be generated from a given operator actuating force.

A pedal operated structure, indicated generally by the reference numeral 62 is provided at the left hand side of the motorcycle 11 for operating the transmission shift drum shaft 35. This mechanism includes a shift pedal lever 63 that is pivotally supported on the left hand down tube 42 by means of a pivot pin 64. The lever 63 extends rearwardly from the pivotal support toward the left hand foot peg 44 but terminates at a pedal portion 65 that is spaced forwardly thereof so that an operator must remove his left hand foot in order to actuate the pedal 65.

The pedal lever 63 is also a bell crank and has a upwardly extending arm portion 66 which is shorter in length than the portion 63 and which has a pivotal connection 67 to one end of a shift control link 68. The opposite end of the shift control link 68 is pivotally connected, by means of a pivot pin 69 to a shift lever 71 that is affixed to the shift shaft 35. Again, this construction provides a mechanical advantage so that a given input force exerted by the operator's left foot will exert a greater rotational force on the shift shaft 35 so as to assist in shifting.

Figure 2:
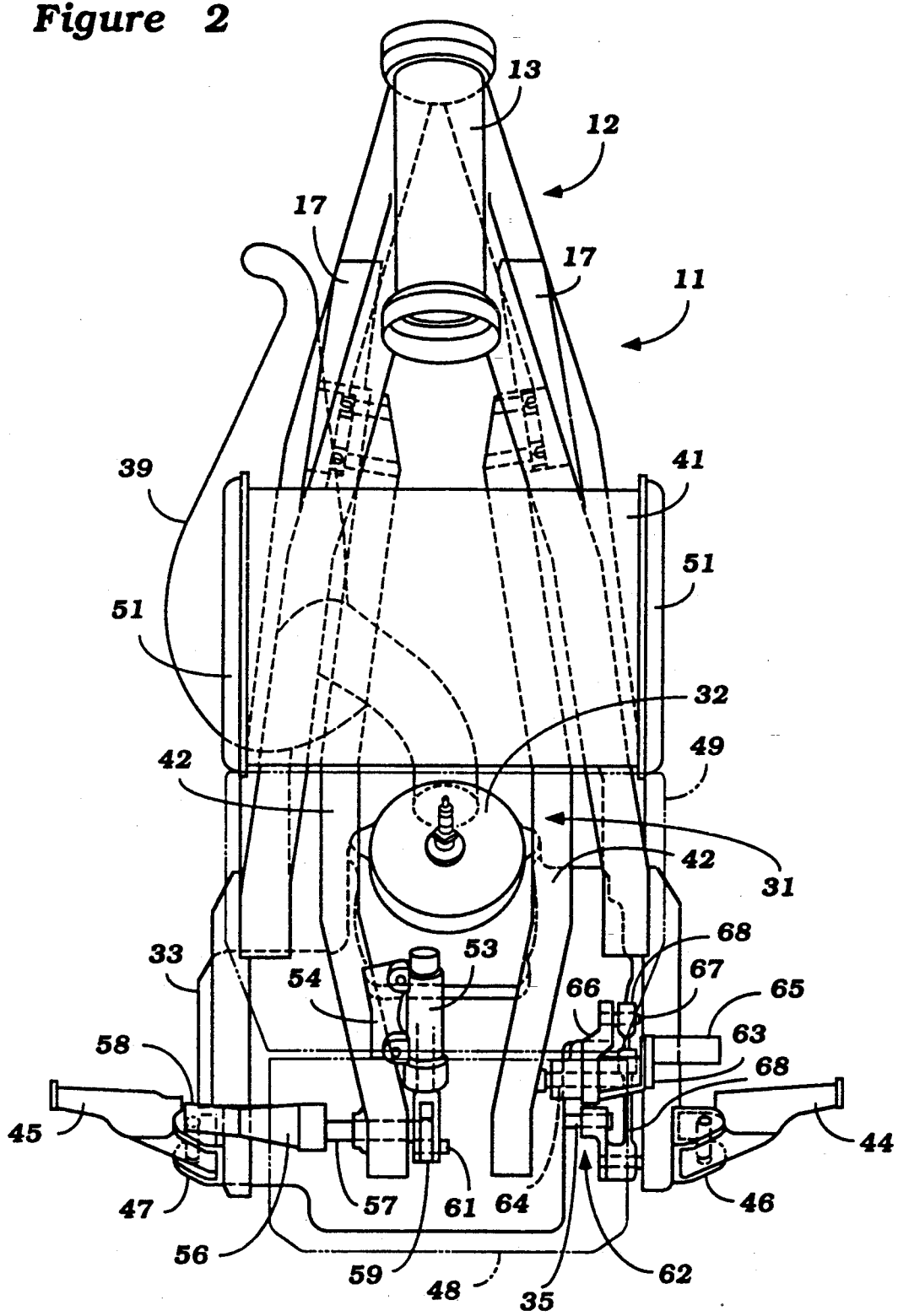
FIG. 2 is a front elevation view of the motorcycle with the front fork and front wheel removed to more clearly show details of the construction.

As may be seen in FIG. 2, by placing the brake pedal 53 and shift pedal 65 forwardly of the foot pegs 44 and 45, it is also possible to place these pedals at a narrow distance L and narrower than the width of the foot pegs 44 and 45 and thus provide a more compact assembly. This protects the pedals 58 and 65 and the linkage actuated thereby from damage in the event of extreme leaning or in the event the motorcycle should fall over. This inward placement is also possible because of the fact that the operator does not operate these pedals with his feet placed upon the foot pegs 44 and 45. Also, with prior art mechanisms that have employed a linkage system between the pedal and the device actuated by it, as previously noted, it has been necessary to put the pedals to the rear of the foot pegs and outwardly thereof. The disadvantages of this type of construction are avoided with the present invention.

It should be readily apparent from the foregoing description that the described construction permits an extremely compact motorcycle pedal construction while, at the same time, permitting the operator to exert greater forces on these pedals than with prior art type of construction. Of course, the foregoing description is that of a preferred embodiment of the invention and various changes and modifications may be made without departing from the spirit and scope of the invention, as defined by the appended claims.

I claim:

1. A motorcycle construction comprised of a frame assembly suspending front and rear wheels and carrying a seat for accommodating a rider, an engine and change speed transmission carried by said frame assembly for driving said rear wheel, a pair of foot pegs carried at the lower portion of said frame assembly on opposite side thereof for accommodating the feet of a rider seated upon said seat, a brake for braking at least one of said wheels, a master cylinder for operating said brake, an operating brake pedal formed at the rearward end of a brake pedal lever supported for pivotal movement by said frame assembly about a pivot point disposed forwardly of said foot peg, and means for connecting said brake pedal to said master cylinder for operation thereof by a rider seated upon said seat.

2. A motorcycle construction as set forth in claim 1 wherein the master cylinder is supported in a generally vertically extending direction at the front of the frame.

3. A motorcycle construction as set forth in claim 1 wherein the pedal operates the master cylinder through a linkage system.

4. A motorcycle construction as set forth in claim 3 wherein the pedal and linkage system provides a mechanical advantage for amplifying the force applied to the master cylinder from the force applied by the rider.

5. A motorcycle construction as set forth in claim 4 wherein the master cylinder is supported in a generally vertically extending direction at the front of the frame assembly.

6. A motorcycle construction as set forth in claim 5 wherein the brake pedal lever comprises a bell crank having one of the lever arms carrying the brake pedal and the other lever arm is connected to the master cylinder.

7. A motorcycle construction as set forth in claim 6 wherein the bell crank is pivotally supported on the frame assembly and its lever arm carrying the brake pedal is longer than the lever arm connected to the linkage system.

8. A motorcycle construction comprised of a frame assembly suspending front and rear wheels and carrying a seat for accommodating a rider, an engine and change speed transmission carried by said frame assembly for driving said rear wheel, a pivotal selection shaft for changing the speed ratio of said transmission pivotal about a transverse axis, a pair of foot pegs carried at the lower portion of said frame assembly on opposite sides thereof for accommodating the feet of a rider seated upon said seat and to the rear of said selector shaft, a brake for braking at least one of said wheels, a master cylinder for operating said brake, a transmission operating pedal supported for movement by said frame assembly about a pivotal axis disposed forwardly of said foot peg and of said selection shaft, and means for connecting said transmission pedal to said transmission selection shaft.

9. A motorcycle construction as set forth in claim 8 wherein the pedal operates the selector shaft through a linkage system.

10. A motorcycle construction as set forth in claim 9 wherein the pedal and linkage system provides a mechanical advantage for amplifying the force applied to the shift selector shaft from the force applied by the rider.

11. A motorcycle construction as set forth in claim 10 wherein the transmission pedal is connected to one arm of a bell crank.

12. A motorcycle construction as set forth in claim 11 wherein the bell crank is connected to the selector shaft through the linkage system.

13. A motorcycle construction as set forth in claim 1 wherein the brake operating pedal is supported at one side of the frame assembly and further including a transmission operating pedal supported for movement by the frame assembly at the other side thereof and forwardly of the respective foot peg and means for connecting said transmission operating pedal to the transmission for operation thereof by a rider seated upon the seat.

14. A motorcycle construction as set forth in claim 13 wherein both of the pedals are connected to the device operated thereby through a respective linkage system.

15. A motorcycle construction as set forth in claim 14 wherein both of the linkage systems provide a mechanical advantage for amplifying the force exerted by the rider to the respective pedal to the device operated thereby.

16. A motorcycle construction as set forth in claim 15 wherein the brake and transmission operating pedals are positioned closer to a longitudinal center line of the motorcycle than the foot pegs so that an rider must remove his foot from the foot pegs in order to operate either of the operating pedals.

17. A motorcycle construction as set forth in claim 16 wherein both of the operating pedals are mounted to one arm of a respective bell crank.

18. A motorcycle construction as set forth in claim 17 wherein each operating pedal bell crank has its longer lever arm carrying the pedal operated by the feet of the rider.

* * * * *